US011613015B2

(12) United States Patent
Rácz et al.

(10) Patent No.: US 11,613,015 B2
(45) Date of Patent: Mar. 28, 2023

(54) TECHNIQUE FOR PROVIDING RELIABLE CONTROL IN A CLOUD ROBOTICS SYSTEM

(71) Applicant: Telefonaktiebolaget LM Ericsson (publ), Stockholm (SE)

(72) Inventors: Sándor Rácz, Cegléd (HU); András Rácz, Budapest (HU); Norbert Reider, Tényö (HU); Geza Szabo, Kecskemet (HU)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 229 days.

(21) Appl. No.: 16/641,278

(22) PCT Filed: Sep. 18, 2017

(86) PCT No.: PCT/EP2017/073456
§ 371 (c)(1),
(2) Date: Feb. 24, 2020

(87) PCT Pub. No.: WO2019/052665
PCT Pub. Date: Mar. 21, 2019

(65) Prior Publication Data
US 2020/0189100 A1 Jun. 18, 2020

(51) Int. Cl.
*B25J 9/16* (2006.01)
(52) U.S. Cl.
CPC ............ *B25J 9/1664* (2013.01); *B25J 9/161* (2013.01); *B25J 9/1674* (2013.01); *G05B 2219/31258* (2013.01)

(58) Field of Classification Search
CPC ........ B25J 9/1664; B25J 9/161; B25J 9/1674; B25J 9/1689; G05B 2219/31258; G05B 2219/31457; G05B 19/4103
See application file for complete search history.

(56) References Cited

U.S. PATENT DOCUMENTS

2005/0055130 A1* 3/2005 Carlson .................. B25J 9/1689
700/245
2010/0070079 A1* 3/2010 Mangaser ............ G05B 19/409
700/259

(Continued)

FOREIGN PATENT DOCUMENTS

EP 2214067 A1 8/2010
EP 2865495 A1 4/2015

*Primary Examiner* — Abby Y Lin
*Assistant Examiner* — Dylan Brandon Mooney
(74) *Attorney, Agent, or Firm* — Coats & Bennett, PLLC (57) ABSTRACT

A technique for providing reliable control of a robot (304) in a cloud robotics system (300) is disclosed. A computing unit configured to execute a concealment component (100) for concealing delayed or lost commands sent to the robot (304) by a robot controller (302) in the cloud robotics system (300) comprises at least one processor and at least one memory, wherein the at least one memory contains instructions executable by the at least one processor such that the concealment component (100) is operable to detect a missing command expected to be received by the robot (304) from the robot controller (302), the missing command detected based on a delay or loss of the command in a communication path between the robot (304) and the robot controller (302), generate a substitutional command corresponding to an expected instruction of the missing command, and send the substitutional command to the robot (304).

14 Claims, 7 Drawing Sheets

(56) References Cited

U.S. PATENT DOCUMENTS

| | | | |
|---|---|---|---|
| 2011/0044331 A1* | 2/2011 | Nagashima | G05B 9/02 |
| | | | 370/389 |
| 2011/0144803 A1* | 6/2011 | Egawa | H04L 47/20 |
| | | | 700/245 |
| 2013/0166621 A1* | 6/2013 | Zhu | H04L 67/12 |
| | | | 709/201 |
| 2015/0120048 A1* | 4/2015 | Summer | B25J 9/1692 |
| | | | 700/254 |
| 2017/0182664 A1* | 6/2017 | Watts | H04L 67/10 |
| 2019/0051310 A1* | 2/2019 | Chang | H04L 65/607 |
| 2020/0272123 A1* | 8/2020 | Denenberg | G06T 17/00 |

* cited by examiner

TECHNIQUE FOR PROVIDING RELIABLE CONTROL IN A CLOUD ROBOTICS SYSTEM

TECHNICAL FIELD

The present disclosure generally relates to the field of cloud robotics. In particular, a technique for providing reliable control of a robot in a cloud robotics system is presented. The technique may be embodied in an apparatus, a method, and a computer program.

BACKGROUND

In traditional robotic systems, robots are controlled locally by robot controllers using wired connections, such as industrial field buses using ProfiNet, a widely used industrial standard for data communication over Industrial Ethernet, to provide reliable communication between robots and controllers, e.g., to provide reliable transmission of commands to control the robots' actuators (e.g., servos, stepper motors, etc.) and to provide reliable transmission of status messages (e.g., sensor values obtained by joint position sensors, proximity sensors, etc.) from robots to controllers.

As compared to traditional systems, cloud robotics is an emerging field of robotics which shifts robot control to the cloud in order to benefit from the powerful computational resources of cloud computing environments. In cloud robotics systems, the control logic of the robot controllers is executed in the cloud and wireless connections are generally used to establish connectivity between the robots and the controllers. Typically, wireless connections are realized using wireless communication networks, such as LTE or 5G networks, for example.

Further, in robot control, it is generally distinguished between continuous control and event based control of a robot. In continuous control, commands, such as movement commands, are sent periodically to the robot in compliance with a predetermined communication scheme. In case of velocity control of a UR5 robot arm (as manufactured by Danish robot manufacturer Universal Robots), for example, the controller periodically sends velocity commands to the robot arm with 125 Hz, thereby enabling fine-grained movement operations (each operation representing a small movement increment) of the robot under control of the controller. In event based control, on the other hand, a movement command indicates a desired final position to be reached by the robot (possibly requiring a multitude of single movement operations), wherein the actual movement operations required to reach the final position are executed under control of the robot (and not under control of the robot controller).

From the communication channel's point of view, continuous control and event based control have different quality of service requirements. While lossless transmission is a decisive criterion for event based control (requiring a retransmission mechanism for lost commands), low transmission delay is a decisive criterion for continuous control. In fact, due to the mentioned incremental characteristic of continuous control, a retransmitted command may even be counterproductive in some cases. For example, if a retransmitted command is overtaken by a newer command (which has meanwhile been sent following the periodical communication scheme), the retransmission does not have any gain from the control's point of view. Even worse, if the retransmission delays the transmission of newer commands, performance degradation may occur.

In either case, the delay or loss of commands caused by a communication channel failure may result in degradation of robot control performance. In particular, in cloud robotics systems in which low-level robot control is carried out in accordance with a continuous control scheme, uncontrolled packet loss or delay over the communication channel may result in degraded or failed robot operation (e.g., a deviation from a desired trajectory) or even cause serious damage due to a collision with an obstacle, for example.

SUMMARY

Accordingly, there is a need for a technique for providing reliable control of a robot in a cloud robotics system which avoids one or more of the problems discussed above, or other problems.

According to a first aspect, a computing unit for providing reliable control of a robot in a cloud robotics system is provided. The computing unit is configured to execute a concealment component for concealing delayed or lost commands sent to the robot by a robot controller in the cloud robotics system. The computing unit comprises at least one processor and at least one memory, wherein the at least one memory contains instructions executable by the at least one processor such that the concealment component is operable to detect a missing command expected to be received by the robot from the robot controller, the missing command detected based on a delay or loss of the command in a communication path between the robot and the robot controller, generate a substitutional command corresponding to an expected instruction of the missing command, and send the substitutional command to the robot.

The substitutional command may be generated using a machine learning based model and the substitutional command may be generated based on one or more sensor values sent from the robot to the robot controller. The one or more sensor values may be used to determine a predicted control command value, wherein the substitutional command may be generated based on the predicted control command value. The predicted control command value may be a delta value corresponding to a difference to a control command value of a previous command received by the robot from the robot controller, wherein the substitutional command may be generated based on the previous command and the delta value.

The machine learning based model may be trained by at least one of typical trajectories of the robot and random trajectories of the robot. Training data used for training the machine learning based model may be determined from messages exchanged between the robot and the robot controller during an operation of the robot. The training data may comprise at least one of one or more control values identified in commands sent from the robot controller to the robot, and one or more sensor values identified in status messages sent from the robot to the robot controller.

Further, at least one operation range limit of the robot may be determined from messages exchanged between the robot and the robot controller during an operation of the robot. The at least one operation range limit may comprise at least one of one or more minimum and/or maximum control values observed during the operation of the robot, and one or more minimum and/or maximum control gradient values observed during the operation of the robot. Generating the substitutional command may comprise applying the at least one operation range limit to the substitutional command.

The at least one memory may further contain instructions executable by the at least one processor such that the concealment component is operable to initiate a safety stop of the robot when a duration of the delay or loss of the missing command exceeds a predetermined time limit. The time limit may be determined based on a passive measurement which includes observing commands sent to the robot and determining a difference between the observed commands and corresponding substitutional commands for different prediction periods. The time limit may also be determined based on an active measurement which includes actively discarding commands for different prediction periods and observing a behavior of the robot after discarding the commands. The time limit may initially be determined using the passive measurement and refined based on the active measurement. The different prediction periods used for the active measurement may include time periods less than the different prediction periods used for the passive measurement. A largest acceptable prediction period among the different prediction periods may be used as the time limit.

According to a second aspect, a method for providing reliable control of a robot in a cloud robotics system is provided. The method is performed by a concealment component for concealing delayed or lost commands sent to the robot by a robot controller in the cloud robotics system and comprises detecting a missing command expected to be received by the robot from the robot controller, the missing command detected based on a delay or loss of the command in a communication path between the robot and the robot controller, generating a substitutional command corresponding to an expected instruction of the missing command, and sending the substitutional command to the robot.

The apparatus features described herein with reference to the first aspect may also be embodied as functions, services or steps in the method of the second aspect.

According to a third aspect, a computer program product is provided. The computer program product comprises program code portions for performing the method of the second aspect when the computer program product is executed on one or more computing devices. The computer program product may be stored on a computer readable recording medium, such as a semiconductor memory, DVD, CD-ROM, and so on. The computer program product may also be provided for download via a communication network (e.g., the Internet or a proprietary network).

BRIEF DESCRIPTION OF THE DRAWINGS

Implementations of the technique presented herein are described herein below with reference to the accompanying drawings, in which.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other implementations that depart from these specific details.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figure 1:
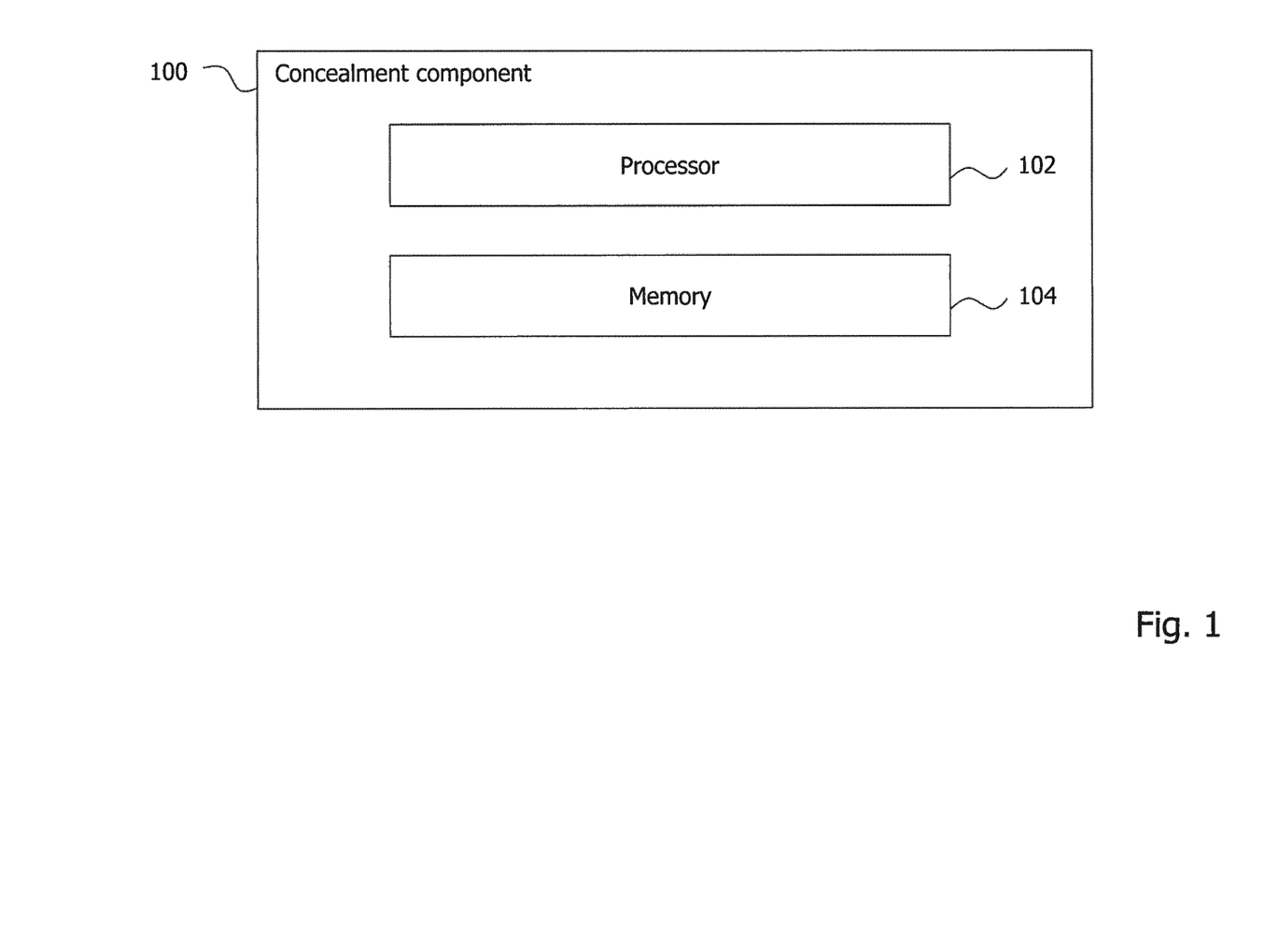
FIG. 1 illustrates an exemplary composition of a computing unit configured to execute a concealment component according to the present disclosure.

FIG. 1 schematically illustrates an exemplary composition of a computing unit which is configured to execute a concealment component 100 for concealing delayed or lost commands sent to a robot by a robot controller in a cloud robotics system.

The computing unit comprises at least one processor 102 and at least one memory 104, wherein the at least one memory 104 contains instructions executable by the at least one processor 102 such that the concealment component 100 is operable to carry out the method steps described herein below. It will be understood that the computing unit for executing the concealment component 100 may be a physical computing unit as well as a virtualized computing unit, such as a virtual machine, for example. It will further be appreciated that the computing unit may not necessarily be implemented as a standalone computing unit, but may be implemented as components—realized in software and/or hardware—residing on multiple distributed computing units as well.

Figure 2A:
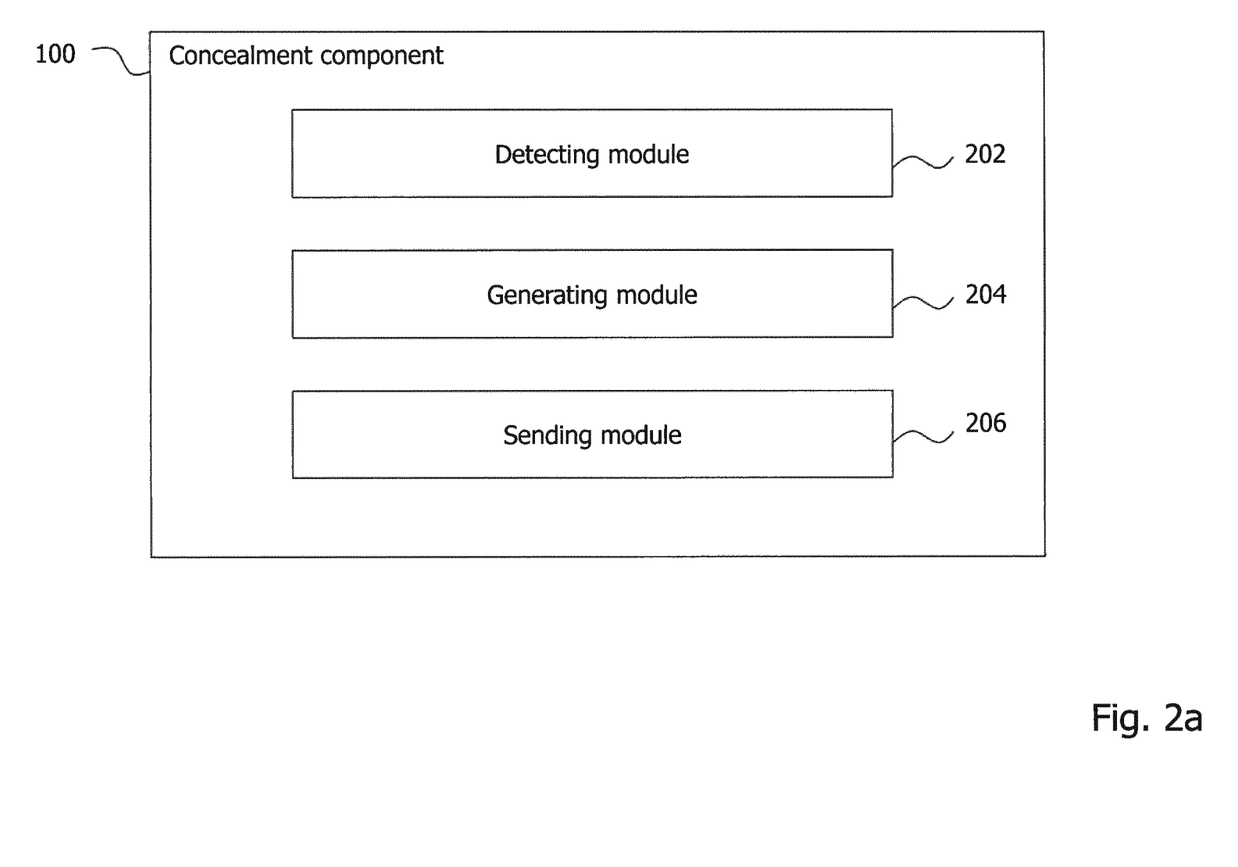
FIGS. 2a and 2b illustrate a modular composition of a computing unit configured to execute a concealment component according to the present disclosure and a corresponding method which may be performed by the concealment component.
Figure 2B:
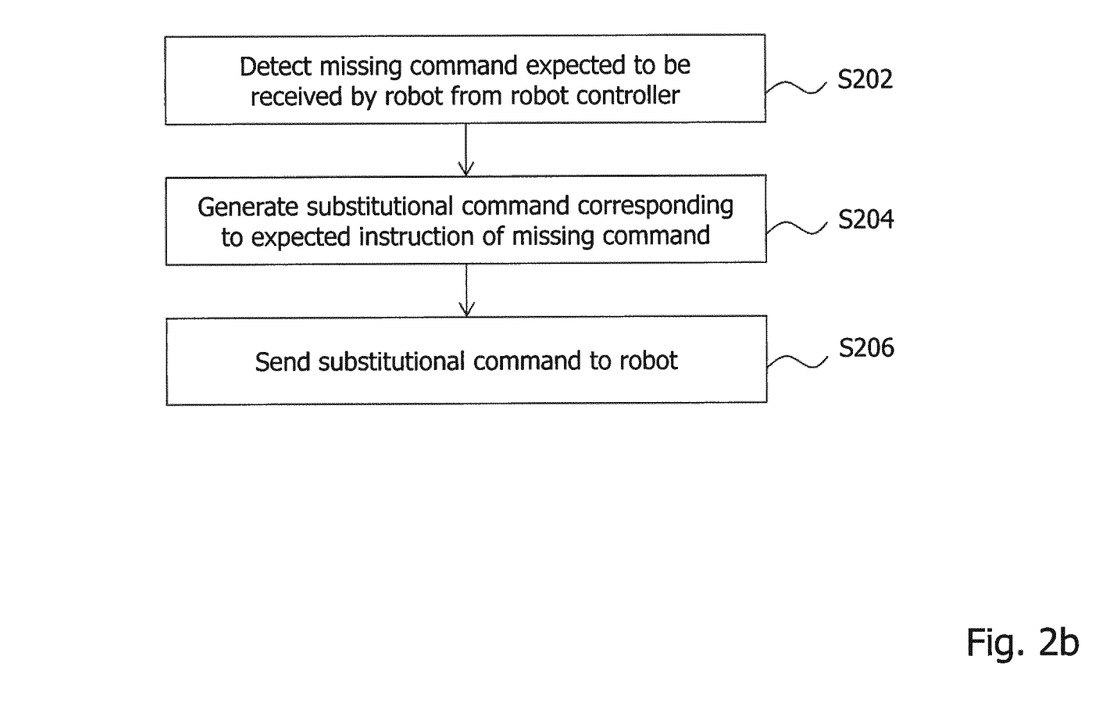

FIG. 2a schematically illustrates an exemplary modular composition of the computing unit which is configured to execute the concealment component 100 and FIG. 2b illustrates a corresponding method which may be performed by the concealment component 100. The basic operation of the concealment component 100 will be described in the following with reference to both FIGS. 2a and 2b.

In step S202, a detecting module 202 of the concealment component 100 may detect a missing command expected to be received by the robot from the robot controller, wherein the missing command is detected based on a delay or loss of the command in a communication path between the robot and the robot controller. In step S204, a generating module 204 of the concealment component 100 may generate a substitutional command corresponding to an expected instruction of the missing command and, in step S206, a sending module 206 of the concealment component 100 may send the substitutional command to the robot.

The robot controller may be executed in a cloud (i.e., more specifically, in a cloud computing environment) and the robot may be a robot that communicates with the robot controller to exchange messages required for control of the robot. For example, the robot may send status messages to the robot controller, wherein a status message may contain information about the current physical state measured by sensors of the robot, such as joint positions, velocities, forces, currents, or the like. Status messages may enable the robot controller to decide on a next action to be performed by the robot and the controller may send corresponding commands, such as movement or velocity commands, to the robot to implement such action accordingly.

During communication between the robot and the robot controller, commands may be delayed or lost due to a failure in the communication path between the robot and the robot controller. In a cloud robotics system, the communication path may comprise a wireless network (e.g., forming a portion of the overall communication path) which may—due to the nature of wireless connectivity—be susceptible to communication failures, such as jitter or temporary loss of connectivity, for example. The concealment component 100 may be employed to conceal the delay or loss of robot control commands due to such communication failures. The concealment component 100 may be arranged between the robot and the wireless network (e.g., a wireless access network, such as an LTE or 5G network) in the communication path between the robot and the robot controller so that commands which are delayed or lost over the wireless network may be detected and substituted by substitutional commands. The concealment component 100 may in other words be an intermediate node in the communication path between the robot and the robot controller which may have access to the messages exchanged between the robot and the robot controller and which may operate to conceal the delay or loss of robot control commands.

By generating a substitutional command in the form of a command that corresponds to an expected instruction of the missing command and sending the substitutional command to the robot instead of the missing command, the concealment component 100 may ensure that the robot may not take notice of the missing command. The substitutional command may be denoted as an artificial command which is sent to the robot as a replacement of the missing command. The robot may process the substitutional command like any other command received from the robot controller and may not recognize that the actual command sent from the robot controller has been delayed or lost. In this way, continuous operation of the robot may be ensured.

The robot may be controlled using a continuous control scheme (as opposed to an event based control scheme, as described above) which may require commands to be sent from the robot controller to the robot in accordance with a predetermined communication scheme. For example, the predetermined communication scheme may require sending commands to the robot in predefined intervals, e.g., periodically sending commands with a specific frequency, such as 125 Hz in case of a UR5 robot arm, for example. The delay or loss of the missing command, e.g., the fact that a command has not arrived in time, may then be detected based on verifying the receipt of commands on compliance with the predetermined communication scheme, such as on compliance with the 125 Hz requirement in case of a UR5 robot arm, for example. In one implementation, the delay or loss of the command may be detected when the command is not received by a time which corresponds to the sum of an expected reception time of the command according to the predetermined communication scheme and a delay threshold value.

The substitutional command may be generated such that the substitutional command corresponds to an expected instruction of the missing command. The expected instruction may reflect an estimated (i.e., predicted) action which is to be performed next by the robot. This action may be estimated in consideration of an operation currently being performed by the robot (e.g., a movement along a certain trajectory) for which an action to be performed next in accordance with the continuous control scheme (e.g., a particular incremental movement as part of the certain trajectory) can be estimated, e.g., at least with a certain likelihood.

In one variant, this estimation may be carried out by means of machine learning techniques. The substitutional command may thus be generated using a machine learning based model, such as using a neural network, a support vector machine, or other suitable techniques known in the field of machine learning, which may be trained accordingly. In particular, the substitutional command may be generated based on one or more sensor values sent from the robot to the robot controller, wherein the machine learning based model may be designed to reflect a relationship between sensor values reported from the robot to the robot controller and commands sent from the robot controller to the robot in turn. The one or more sensor values sent from the robot to the robot controller may be taken as input to the machine learning based model which may produce the substitutional command, or a value to be used for generating the substitutional command, as a corresponding output.

In one implementation, the one or more sensor values may be used to determine an absolute command that does not depend on any previous command. In another implementation, the one or more sensor values may be used to determine a predicted control command value, wherein the substitutional command may be generated based on the predicted control command value. Both the absolute command and the predicted control command value may be produced by the machine learning based model. In one particular implementation, the predicted control command value may be a delta value corresponding to a difference to a control command value of a previous command received by the robot from the robot controller, wherein the substitutional command may be generated based on the previous command and the delta value. Thus, instead of generating absolute commands, the concealment component 100 may be configured to compile the substitutional command based on a previous command (i.e., a command sent in a previous interval according to the continuous control scheme) and the delta value produced by the machine learning based model using the one or more sensor values as input. In an example, the one or more sensor values may include velocity and/or acceleration values for joints of an arm of the robot and, upon receiving these values as input, the machine learning based model may produce delta values to be used as parameters in speed commands that will be sent to the robot as substitutional commands to control the joints of the robot accordingly. The speed commands may in this case correspond to previous commands (i.e., commands sent in a previous interval according to the continuous control scheme) and the produced delta values may be combined as parameters into these commands to reflect a required change in speed, for example. If the delta value is zero, the previous command may simply be sent again.

The machine learning based model may be trained to reflect the relationship between sensor values sent from the robot to the robot controller and commands (or command values, such as delta values, as mentioned above) sent from the robot controller to the robot in turn. For this purpose, the machine learning based model may be trained by at least one of typical trajectories of the robot and random trajectories of the robot. For example, the concealment component 100 may observe messages which are exchanged between the robot and the robot controller during operation of the robot and extract the required training data therefrom. This may include observing both status messages including sensor values sent from the robot to the robot controller as well as observing commands sent from the robot controller to the robot. Training data used for training the machine learning based model may then be determined from the messages exchanged between the robot and the robot controller during an operation of the robot. The determined training data may comprise at least one of one or more control values identified in commands sent from the robot controller to the robot, and one or more sensor values identified in status messages sent from the robot to the robot controller. As an example, the one or more control values identified in commands sent from the robot controller to the robot to may comprise joint velocity values extracted from speed commands sent from the robot to the controller, and the one or more sensor values identified in status messages sent from the robot to the robot controller may comprise joint positions and/or velocities measured by a sensor of the robot extracted from corresponding status messages sent from the robot to the robot controller.

Similarly, at least one operation range limit of the robot may be determined from messages exchanged between the robot and the robot controller during an operation of the robot. The at least one operation range limit may comprise at least one of one or more minimum and/or maximum control values observed during the operation of the robot, and one or more minimum and/or maximum control gradient values observed during the operation of the robot. These values may comprise minimum and/or maximum joint velocities or minimum and/or maximum acceleration values observed during the operation of the robot, for example. Generating the substitutional command may comprise applying the at least one operation range limit to the substitutional command so that it may be ensured that execution of the substitutional command by the robot does not lead to an excess of the at least one operation range limit.

As mentioned above, communication failures in the communication path, in particular in the wireless network portion of the communication path, may lead to delay or loss of commands transmitted from the robot controller to the robot. In order to mitigate the effects of large delays or losses, the concealment component 100 may be configured to perform countermeasures in case the delay or loss of an expected command gets too large. For this purpose, the at least one memory 104 may further contain instructions executable by the at least one processor 102 such that the concealment component 100 is operable to initiate a safety stop of the robot when a duration of the delay or loss of the missing command exceeds a predetermined time limit. In other words, the concealment component 100 may measure the duration of missing commands and, when the gap of missing commands gets larger than the predetermined time limit, the concealment component may carry out a safety function to stop the operation of the robot and to prevent the robot from performing a failed operation (e.g., a large deviation from a desired trajectory) or causing damage due to a collision with an obstacle, for example.

The predetermined time limit may correspond to a threshold value and may be determined by the concealment component 100. In one implementation, the time limit may be determined based on a passive measurement which includes observing commands sent to the robot and determining a difference between the observed commands and corresponding substitutional commands for different prediction periods. In this case, actual commands received from the robot controller may be forwarded to the robot as usual (i.e., without any delay or loss) and the substitutional commands may be generated to check a command error by determining the difference between the observed commands and a corresponding substitutional commands (i.e., the substitutional commands are not sent to the robot in this case). The command error may reflect a difference in parameter values of the actual commands and the corresponding substitutional commands, wherein parameter values of the substitutional commands may be generated based on delta values produced by the machine learning based model, for example. The passive measurement may be performed for a variety of different prediction periods and, as a result, a largest acceptable prediction period among the different prediction periods may be used as the time limit. The measurement may be called to be passive because the actual stream of commands sent from the robot controller to the robot is observed only, but not actually interfered.

In another implementation, the time limit may be determined based on an active measurement which includes actively discarding commands for different prediction periods and observing a behavior of the robot after discarding the commands. In this case, actual commands received from the robot controller (i.e., without any delay or loss) may be discarded by the concealment component 100 and replaced by correspondingly generated substitutional commands which are sent to the robot instead. This may be performed for a variety of different prediction periods and the behavior of the robot may be observed accordingly, such as by observing disturbances in sensor values reported from the robot to the robot controller in response, for example. As a result, a largest acceptable prediction period (e.g., a prediction period for which the observed disturbance in sensor values is still acceptable) among the different prediction periods may be used as the time limit. This measurement may be called to be active because the actual stream of commands sent from the robot controller to the robot is actually interfered in this case.

In one particular implementation, the determination of the time limit may be performed using a two-step approach. In this case, the time limit may initially be determined using the passive measurement (in a first step) and then be refined based on the active measurement (in a second step). The different prediction periods used for the active measurement may in this case include time periods less than the different prediction periods used for the passive measurement, so that the refinement performed based on the active measurement may reduce (and not increase) the initially determined time limit. As an example, in the passive measurement, the difference between an actual command and an artificially generated substitutional command may be determined for various time periods between 0 and 200 ms and, as a result, the time limit may be set to 150 ms, for example, reflecting the fact that, after 150 ms, the error between the actual and the substitutional command gets greater than an accepted error. In the subsequently performed active measurement, observations may be performed for various time periods between 0 and the initially determined safety limit, i.e., 150 ms, and, as a result, the time limit may be set to 100 ms, for example, reflecting the fact that, even if commands are delayed for 100 ms, the disturbance in sensor values is still acceptable.

It will be understood that other approaches for determining the time limit as a safety limit for automatically stopping the operation of the robot may be employed. For example, other approaches may take into consideration a loss pattern of the communication channel or determine the time limit as a function of a criticality level of an operation currently being performed by the robot.

Figure 3:
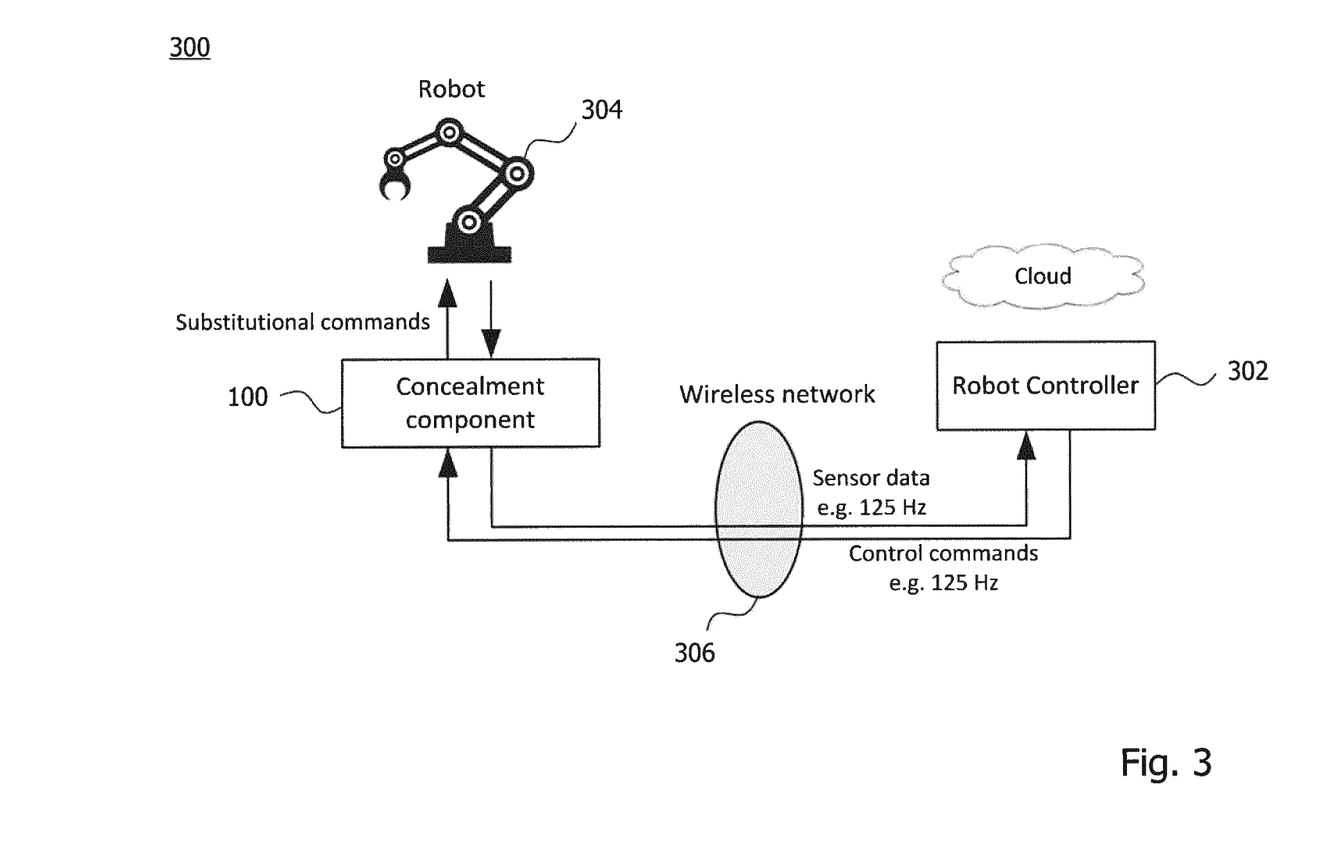
FIG. 3 schematically illustrates a cloud robotics system comprising a robot and a robot controller in which a concealment component according to the present disclosure operates to conceal delayed or lost commands sent to the robot by the robot controller.

FIG. 3 schematically illustrates an exemplary cloud robotics system 300 which comprises a robot controller 302 executed in a cloud (i.e., more specifically, in a cloud computing environment) and a robot 304 that communicates with the robot controller 302 over a wireless network 306 (e.g., a wireless access network, such as an LTE or 5G network) to exchange messages required for control of the robot 304. As explained above, these messages may comprise status messages sent from the robot 304 to the robot controller 302 containing sensor data obtained by sensors of the robot 304. Similarly, the robot controller 302 may send control commands to the robot 304 to control the operation of the robot 304 accordingly. As indicated in the figure, both status messages and commands may be periodically send with a frequency of 125 Hz, following a continuous control scheme complying with the 125 Hz requirement of periodically sending commands and status messages in case of a UR5 robot arm, for example.

In the communication path between the robot 304 and the robot controller 302, the concealment component 100 is arranged on the side of the robot 304 (considered from the viewpoint of the wireless network 306). In other words, the concealment component 100 is arranged in the communication path between the wireless network 306 and the robot 304 and, as such, as an intermediate node in the communication path between the robot 304 and the robot controller 302, the concealment component 100 may have access to the messages exchanged between the robot 304 and the robot controller 302 and may analyze the exchanged messages to detect missing commands and to generate substitutional commands to be sent to the robot 304 according to the principles described above in relation to FIGS. 2a and 2b. The computing unit which executes the concealment component 100 may comprise corresponding network interfaces for this purpose, such as an interface for connectivity with the wireless network 306, on the one hand, and an interface for connectivity with the robot 304, on the other hand. It will be understood that the concealment component 100 may generate and send substitutional commands to the robot 304 only, when the detected delay or loss of missing commands exceeds a predetermined delay threshold value, as explained above. If commands arrive from the robot controller 302 in time, on the other hand, the concealment component 100 may simply forward these commands to the robot 304.

In the following, reference is made to FIGS. 4a to 4c which illustrate an exemplary method which may be performed by the concealment component 100. The method comprises three phases, wherein phase 1 is directed to the discovery of relevant elements from commands and status messages exchanged between the robot 304 and the robot controller 302 for use in training the machine learning based model, phase 2 is directed to the training of the machine learning based model using the training data determined in phase 1, and phase 3 is directed to the actual operation of the concealment component 100 using the trained machine learning based model when the robot 304 is controlled by the robot controller 302.

Figure 4A:
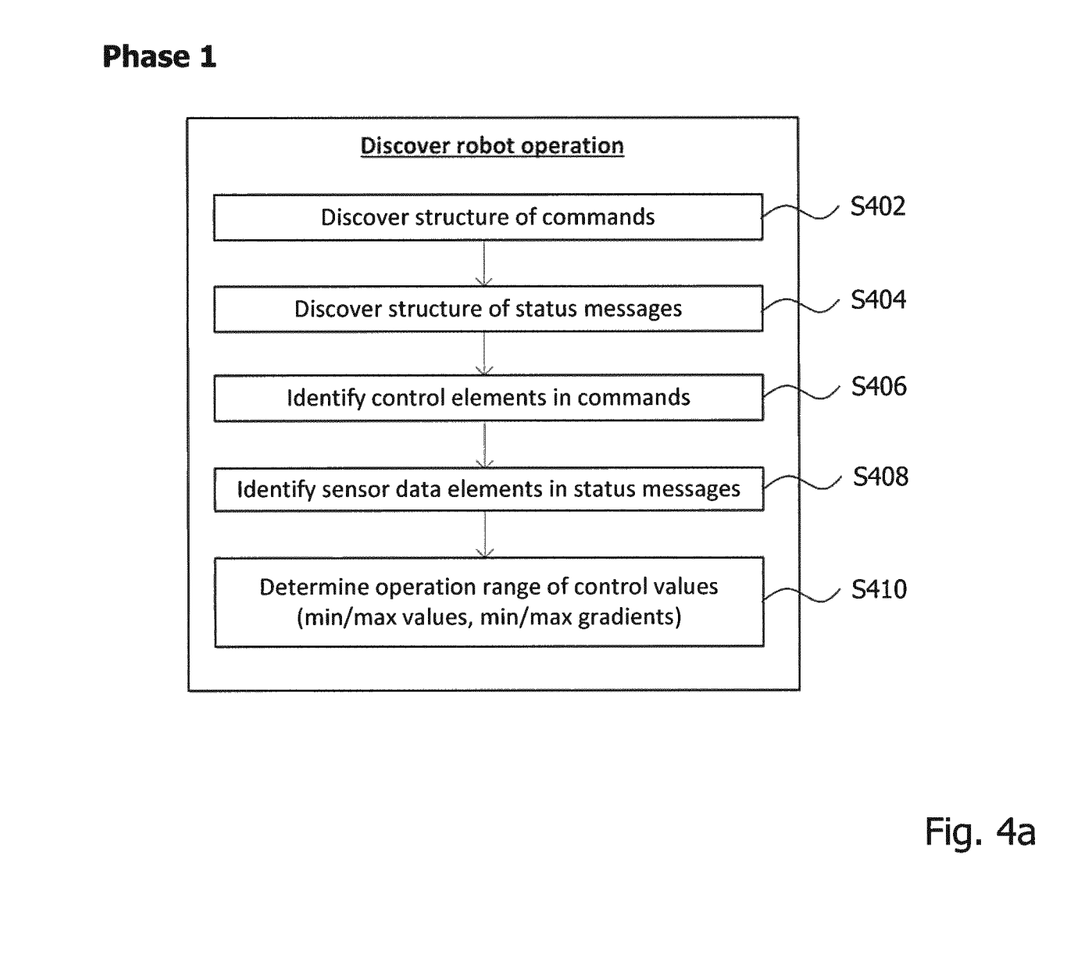
FIGS. 4a to 4c illustrate phases of an exemplary method which may be performed by a concealment component according to the present disclosure.

As illustrated in FIG. 4a, in phase 1, the operation of the robot 304 may discovered by observing messages exchanged between the robot 304 and the robot controller 302, such as when the robot 304 is controlled to perform typical trajectories and/or random trajectories of the robot 304. As part of phase 1, initially, the data communication format used for commands and status messages exchanged between the robot 304 and the robot controller 302 may be discovered. This may include tokenizing the observed commands and status messages and discovering, in step S402, a data structure of the commands and discovering, in step S404, a data structure of the status messages exchanged between the robot 304 and the robot controller 302. When knowledge of the data communication format is obtained, the concealment component 100 may identify, in step S406, control elements in commands sent from the robot controller 302 to the robot 304 (e.g., movement control elements, including joint velocity values extracted from speed commands) and, similarly, the concealment component 100 may identify, in step S408, sensor data elements in status messages sent from the robot 304 to the robot controller 302 (e.g., movement related data elements, including joint positions and/or velocities measured by sensors of the robot 304). Finally, in step S410, the concealment component 110 may determine an operation range of the observed control values and derive one or more operation range limits therefrom. These may include minimum and/or maximum control values and minimal and/or maximum gradient values observed during the operation of the robot, for example.

Figure 4B:
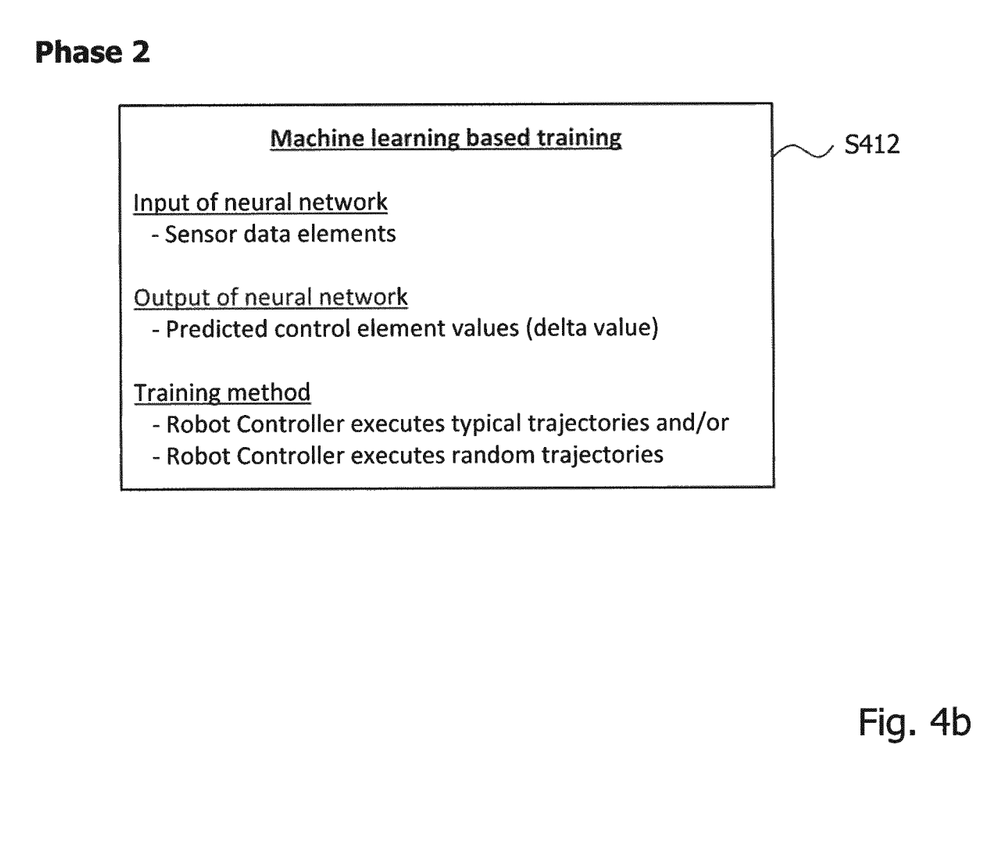

As illustrated in FIG. 4b, in phase 2, the concealment component 100 may then carry out training of the machine learning based model (denoted in the figure as step S412). In the illustrated example, the machine learning based model corresponds to a neural network which is trained using the sensor data elements identified in step S408 as input to the neural network, and using the control elements identified in step S406 (or delta values contained therein, e.g., such as delta values representing predicted movement control values) as output to the neural network. As mentioned above, the training may be based on typical trajectories of the robot 304 and/or random trajectories of the robot 304.

Figure 4C:
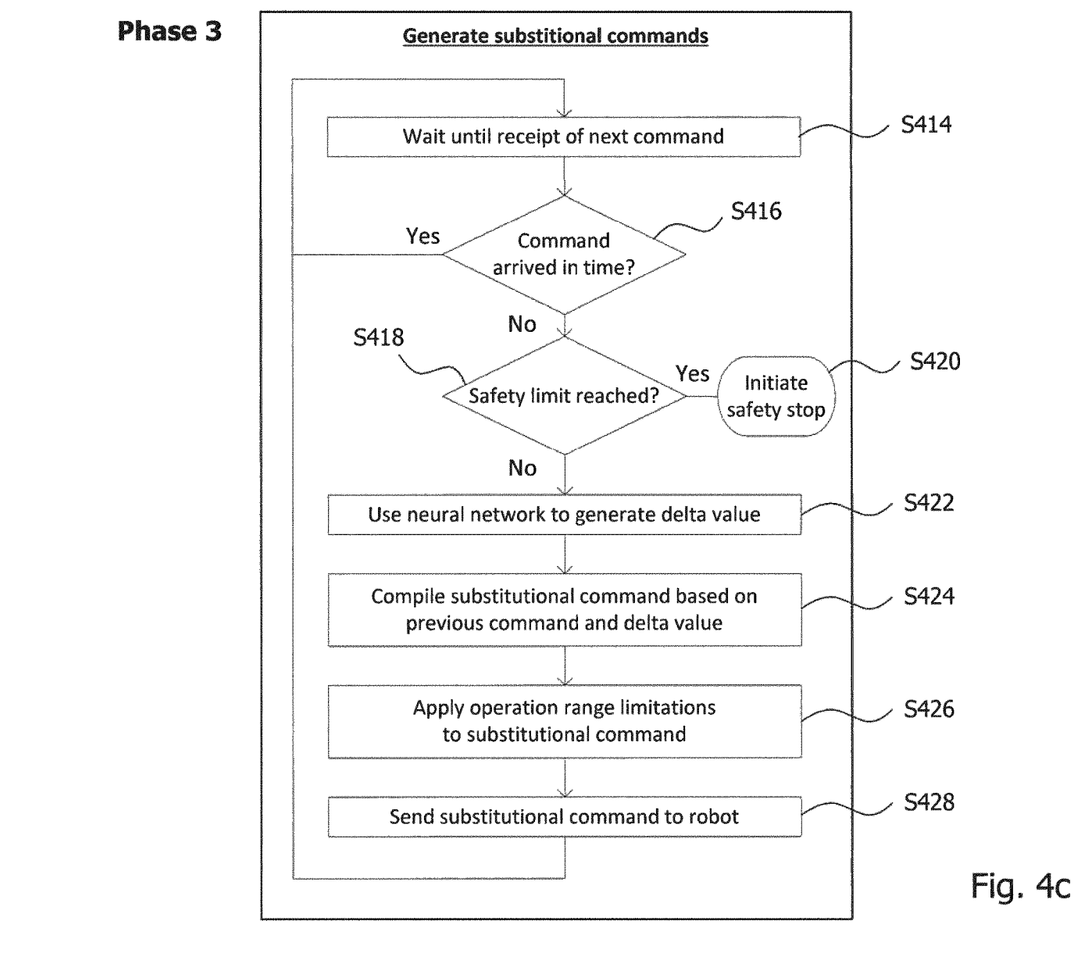

As illustrated in FIG. 4c, in phase 3, the trained machine learning based model may then be used for the generation of substitutional commands during the actual operation of the concealment component 100 when the robot 304 is controlled by the robot controller 302. In phase 3, the concealment component 100 initially waits, in step S414, until a next command destined for the robot 304 is received from the robot controller 302. In step S416, it is then checked whether the command has been received in time, i.e., in accordance with a timing requirement prescribed by the continuous control scheme, and, if so, the command is forwarded to the robot 304 and the concealment component 100 returns to step S414, again waiting for receipt of a next command. If it is determined that the next command has not been received in time, on the other hand, it is checked, in step S418, whether the predetermined safety time limit is reached. If so, the concealment component 100 may initiate, in step S420, a safety stop of the robot 304 in order to prevent the robot from performing a failed operation or causing damage. If the safety time limit has not been reached, on the other hand, the concealment component 100 may use, in step S422, the neural network to produce a delta value for the generation of a substitutional command to be sent to the robot 304 instead of the missing command. Then, in step S424, the concealment component 100 may compile a substitutional command by combining the produced delta value with a previous command, as described above in relation to FIGS. 2a and 2b. In step S426, the concealment component 100 may apply the one or more operation range limits determined in step S410 to the substitutional command in order to avoid that, upon execution of the substitutional command, the robot 304 exceeds the one of these limits. Finally, in step S428, the concealment component 100 may send the finalized substitutional command to the robot 304 for execution by the robot 304, i.e., as a replacement of the missing command.

As has become apparent from the above, the present disclosure provides a technique for concealing delayed or lost commands sent to a robot in a cloud robotics system. The technique presented herein may generally be used to increase the reliability of cloud robot control and may enable running industry critical control over potentially lossy communication channels. Also, the presented technique may mitigate the effects of delayed or lost commands such that the robot perceives a reliable supply of commands from the robot controller. As a consequence, the robot may not be required to support exception or error handling routines that cope with failures arising in the communication path between the robot and the robot controller.

As has further become apparent from the above, the technique presented herein may particularly be suitable for robot control that uses continuous control schemes. Due to the incremental characteristic of continuous control schemes, the expected instruction corresponding to the missing command may be realistically estimated because—since robot controllers typically generate trajectories as smooth as possible, for example, using cubic or higher order splines—control values used in control commands are typically continuous in time. In particular, the use of machine learning techniques may be appropriate to carry out these estimations because machine learning techniques may be trained to well reflect such continuous values and, further, machine learning techniques may be trained to reflect complex tasks in robot control, taking into account the geometry of workspaces, objects, kinematics and dynamics of the robot, for example.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A computing circuit for providing reliable control of a robot in a cloud robotics system, the computing circuit configured to conceal delayed or lost commands sent to the robot by a robot controller in the cloud robotics system, the computing circuit comprising:
 processing circuitry;
 memory containing instructions executable by the processing circuitry whereby the instructions are configured to cause the computing circuit to:
  detect a missing command expected to be received by the robot from the robot controller, the missing command detected based on a delay or loss of the command in a communication path between the robot and the robot controller;
  generate a substitutional command corresponding to an expected instruction of the missing command by generating the substitutional command based on one or more sensor values sent from the robot to the robot controller,
   wherein the one or more sensor values are used to determine a predicted continuous control command value, and
   wherein the substitutional command is generated based on the predicted continuous control command value;
  send the substitutional command to the robot; and
  initiate a safety stop of the robot when a duration of the delay or loss of the missing command exceeds a predetermined time limit.

2. The computing circuit of claim 1, wherein the substitutional command is generated using a machine learning based model.

3. The computing circuit of claim 1:
 wherein the predicted control command value is a delta value corresponding to a difference to a control command value of a previous command received by the robot from the robot controller; and
 wherein the substitutional command is generated based on the previous command and the delta value.

4. The computing circuit of claim 1:
 wherein at least one operation range limit of the robot is determined from messages exchanged between the robot and the robot controller during an operation of the robot; and
 wherein the generating the substitutional command comprises applying the at least one operation range limit to the substitutional command.

5. The computing circuit of claim 1, wherein the time limit is determined based on a passive measurement which includes observing commands sent to the robot and determining a difference between the observed commands and corresponding substitutional commands for different prediction periods.

6. The computing circuit of claim 1, wherein the time limit is determined based on an active measurement which includes actively discarding commands for different prediction periods and observing a behavior of the robot after discarding the commands.

7. A method for providing reliable control of a robot in a cloud robotics system, the method being performed by a computing circuit configured to conceal delayed or lost commands sent to the robot by a robot controller in the cloud robotics system, the method comprising the computing circuit:
 detecting a missing command expected to be received by the robot from the robot controller, the missing command detected based on a delay or loss of the command in a communication path between the robot and the robot controller;
 generating a substitutional command corresponding to an expected instruction of the missing command by generating the substitutional command based on one or more sensor values sent from the robot to the robot controller,
  wherein the one or more sensor values are used to determine a predicted continuous control command value, and
  wherein the substitutional command is generated based on the predicted continuous control command value;
 sending the substitutional command to the robot; and
 initiating a safety stop of the robot when a duration of the delay or loss of the missing command exceeds a predetermined time limit.

8. The method of claim 7, wherein the substitutional command is generated using a machine learning based model.

9. The method of claim 7:
 wherein the predicted control command value is a delta value corresponding to a difference to a control command value of a previous command received by the robot from the robot controller; and wherein the substitutional command is generated based on the previous command and the delta value.

10. The method of claim 7, wherein at least one operation range limit of the robot is determined from messages exchanged between the robot and the robot controller during an operation of the robot.

11. The method of claim 10, wherein the generating the substitutional command comprises applying the at least one operation range limit to the substitutional command.

12. The method of claim 7, wherein the time limit is determined based on a passive measurement which includes observing commands sent to the robot and determining a difference between the observed commands and corresponding substitutional commands for different prediction periods.

13. The method of claim 7, wherein the time limit is determined based on an active measurement which includes actively discarding commands for different prediction periods and observing a behavior of the robot after discarding the commands.

14. A non-transitory computer readable recording medium storing a computer program product for controlling a computing circuit for providing reliable control of a robot in a cloud robotics system, the computing circuit configured to conceal delayed or lost commands sent to the robot by a robot controller in the cloud robotics system, the computer program product comprising program instructions which, when run on processing circuitry of the computing circuit, causes the computing circuit to:
  detect a missing command expected to be received by the robot from the robot controller, the missing command detected based on a delay or loss of the command in a communication path between the robot and the robot controller;
  generate a substitutional command corresponding to an expected instruction of the missing command by
    generating the substitutional command based on one or more sensor values sent from the robot to the robot controller,
    wherein the one or more sensor values are used to determine a predicted continuous control command value, and
    wherein the substitutional command is generated based on the predicted continuous control command value;
  send the substitutional command to the robot; and
  initiate a safety stop of the robot when a duration of the delay or loss of the missing command exceeds a predetermined time limit.

* * * * *